(12) United States Patent
Villani

(10) Patent No.: US 7,070,006 B2
(45) Date of Patent: Jul. 4, 2006

(54) ONE SHOT SHOVEL

(76) Inventor: Emilio M. Villani, 153 Cecilia Avenue, London, Ontario (CA) N5Y 3Z9

( * ) Notice: Subject to any disclaimer, the term of this patent is extended or adjusted under 35 U.S.C. 154(b) by 0 days.

(21) Appl. No.: 10/987,631

(22) Filed: Nov. 12, 2004

(65) Prior Publication Data

US 2005/0110290 A1    May 26, 2005

Related U.S. Application Data

(63) Continuation-in-part of application No. 10/715,800, filed on Nov. 18, 2003, now abandoned.

(51) Int. Cl.
*A01B 1/02* (2006.01)
*A01B 1/16* (2006.01)

(52) U.S. Cl. .......................... 172/371; D8/10; 294/49; 7/116

(58) Field of Classification Search ................ D8/10, D8/12.1; 7/114, 116; 172/371, 375; 294/50, 294/51, 55, 56, 49, 54.5, 53.5, 60; 37/265, 37/285; 30/308.1
See application file for complete search history.

(56) References Cited

U.S. PATENT DOCUMENTS

| | | | | | |
|---|---|---|---|---|---|
| D31,094 | S | * | 6/1899 | Stephensen | D8/10 |
| 1,321,055 | A | * | 11/1919 | Kingsbury | 294/49 |
| 1,518,246 | A | * | 12/1924 | Brandenburg | 294/49 |
| 2,031,556 | A | * | 2/1936 | Brandenburg | 294/49 |
| 2,315,743 | A | * | 4/1943 | Sieg | 37/277 |
| 2,960,230 | A | * | 11/1960 | Fracker | 209/419 |
| 3,782,770 | A | * | 1/1974 | Lee | 294/49 |
| D272,799 | S | * | 2/1984 | Pluss | D8/10 |
| D284,733 | S | * | 7/1986 | Hozumi | D8/10 |
| D326,212 | S | * | 5/1992 | Mingrino | D8/10 |
| 5,520,429 | A | * | 5/1996 | Gregory | 294/49 |
| D374,319 | S | * | 10/1996 | Schildgen | D32/35 |
| 5,727,831 | A | * | 3/1998 | Dritlein, Jr. | 294/59 |
| 6,338,511 | B1 | * | 1/2002 | Douglas et al. | 294/49 |
| D459,957 | S | * | 7/2002 | Lin | D8/10 |
| D474,082 | S | * | 5/2003 | Leiser | D8/10 |
| D484,012 | S | * | 12/2003 | Pierce | D8/10 |

* cited by examiner

*Primary Examiner*—Thomas B. Will
*Assistant Examiner*—Alexandra Pechhold
(74) *Attorney, Agent, or Firm*—Eric Fincham

(57) ABSTRACT

A shovel which has a blade and a handle, the blade having first and second side edges and first and second wings extending outwardly and upwardly from respective side edges, each of the wings having a front edge which merges with a respective shovel side edge at a point rearwardly of the shovel front edge. The wings provide an extra cutting edge useful for cutting roots and the like.

4 Claims, 3 Drawing Sheets

ONE SHOT SHOVEL

The present application is a continuation-in-part of application Ser. No. 10/715,800 filed Nov. 18, 2003 now abandoned.

FIELD OF THE INVENTION

The present invention relates to digging and cutting tools and more particularly, relates to a shovel.

BACKGROUND OF THE INVENTION

Numerous digging and cutting tools are known in the prior art and are commercially available. Widely utilized are two types of shovels wherein a first type is one having a relatively flat bottom surface and a second type wherein the upper surface has a generally concave configuration. Particularly with those shovels having a flat surface, sides may be provided to prevent the material being shovelled from falling off the shovel.

There also have been proposals in the art for shovels having a configuration suited to specialised purposes. Many of these modified implements have been known for a number of years and thus, reference may be had to U.S. Pat. No. 2,49,665 which shows a vegetable and plant cutter which is provided with a V-shaped recess having cutting edges to sever the stem of the plant and cause the latter to fall into a bowl.

A weed cutter attachment for a round headed shovel blade is known from U.S. Pat. No. 3,868,775. A chopping spade is shown in U.S. Pat. No. 3,993,340 wherein the patentee teaches an arrangement wherein there is a collapsable chopping spade for greater portability.

Also known in the art are other types of tools such as the hand held grass edging tool shown in U.S. Pat. No. 5,964, 299 wherein there is provided a flat blade having a generally inwardly disposed V-shaped bottom edge and a pair of opposite side edges also having V-shaped portions formed therein.

A shovel having an outwardly extending portion from the side edge is shown in U.S. Pat. No. 432,472. The shovel or spade is designed to sever or cut roots with the use of the side portions which are designated by the patenteee as knives.

A shovel which also has an upwardly extending side edge is shown in U.S. Pat. No. 887,009 wherein one of the side edges has an auxiliary blade integrally connected with the main blade and extending at right angles thereto. The device is intended for the cutting of sod and the removal or lifting thereof.

SUMMARY OF THE INVENTION

It is an object of the present invention to provide a shovel having a blade which is useful for severing roots and for digging holes in a soil or similar medium.

According to one aspect of the present invention, there is provided a shovel comprising a blade and a handle, the blade consisting essentially of a shovel front edge, a shovel rear edge, first and second shovel side edges, a front surface and a rear surface, the front surface having a first portion extending upwardly adjacent the handle, a balance of the front surface extending arcuately between the first and second shovel side edges to provide an uninterrupted front surface, only first and second wings, the first and second wings extending outwardly and upwardly from respective shovel side edges, each of the wings having a wing front edge and a wing rear edge, each of the wing front edges merging with a respective shovel side edge at a point substantially midway between the shovel front edge and the shovel rear edge, each of the wing front edges having a straight edge portion and an arcuate concave portion, the arcuate concave portion extending between the respective shovel side edge and a respective straight edge portion.

In a further aspect of the present invention, there is provided a shovel comprising a blade and a handle, the blade having a shovel front edge, a shovel rear edge, first and second shovel side edges, a front surface and a rear surface, first and second wings extending outwardly and upwardly from respective shovel side edges, each of the wings having a wing front edge and a wing rear edge, each of the wing front edges merging with a respective shovel side edge at a point substantially mid-way between the shovel front edge and the shovel rear edge to thereby define a wing length, each of the wing front edges having an arcuate concave portion, each of the wings extending outwardly a distance at least equal to 75% of the wing length.

The blade of the shovel of the present invention may either have a generally concave configuration as is well known in the art or alternatively, may be in the form of a spade which has a relatively flat surface. Similarly, the shovel may be formed of any of the known metallic materials suitable for the purpose.

The wings of the shovel extend outwardly a substantial distance. This permits an arrangement such that when the shovel cuts through sod, the wings cut both sides of the sod thus, facilitating the easy withdrawal of the shovel. Furthermore, they enable the easy digging of a trench as both sides cut simultaneously.

The wings extend outwardly a distance equal to at least 75% of the length of the wings with the length being defined as the distance along the side edge of the shovel to which they extend. Preferably, the wings extend outwardly a distance substantially equal to the length of the wings.

The handle portion of the shovel again may be any design which is suitable. The handle may thus range from a straight rod-like member to one having a D-handle formed at the end thereof. Similarly, the connection of the handle to the shovel may be done in any conventional manner known to those knowledgeable in the art.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
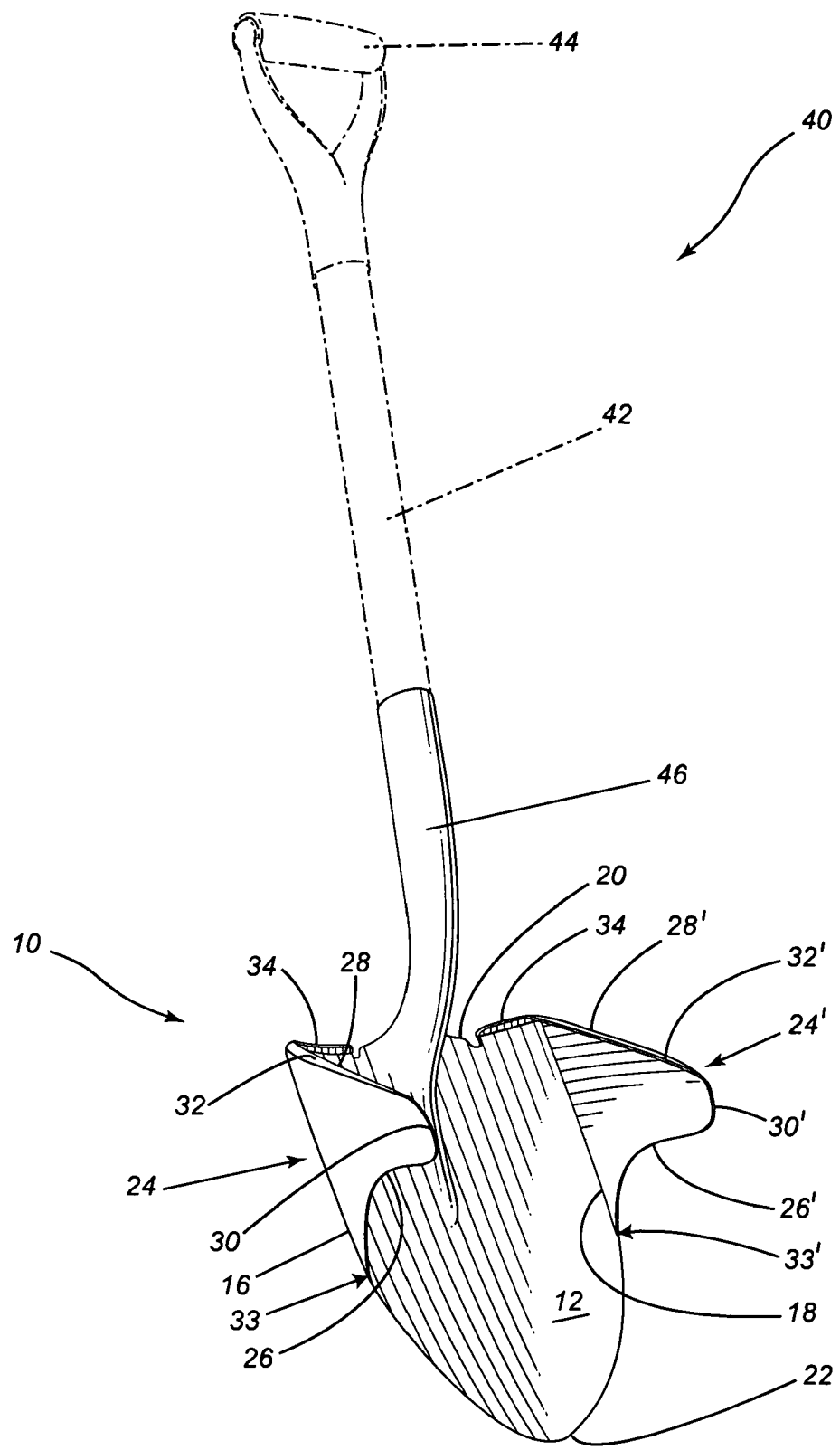
FIG. 1 is a perspective view of a shovel according to an embodiment of the present invention, with the handle portion being shown in dotted lines.

Referring to the drawings in greater detail and by reference characters thereto, there is illustrated a shovel generally designated by reference numeral 40 and which includes a shaft 42 having a D handle 44 at the end thereof.

A blade portion 10 includes a hosel 46 for receiving shaft 42 in a conventional manner.

Blade 10 has a front surface 12 and a rear surface 14, with the central portion having a generally concave configuration as is well known in the art.

Blade 10 is defined by a first side edge 16 and a second side edge 18. There is also a rear edge 20 and a front edge 22. As may be seen, front edge 22 is formed as first side edge 16 and second side edge 18 extends arcuately inwardly.

Extending upwardly from first side edge 16 is a first wing generally designated by reference numeral 24.

Figures 2, 3:
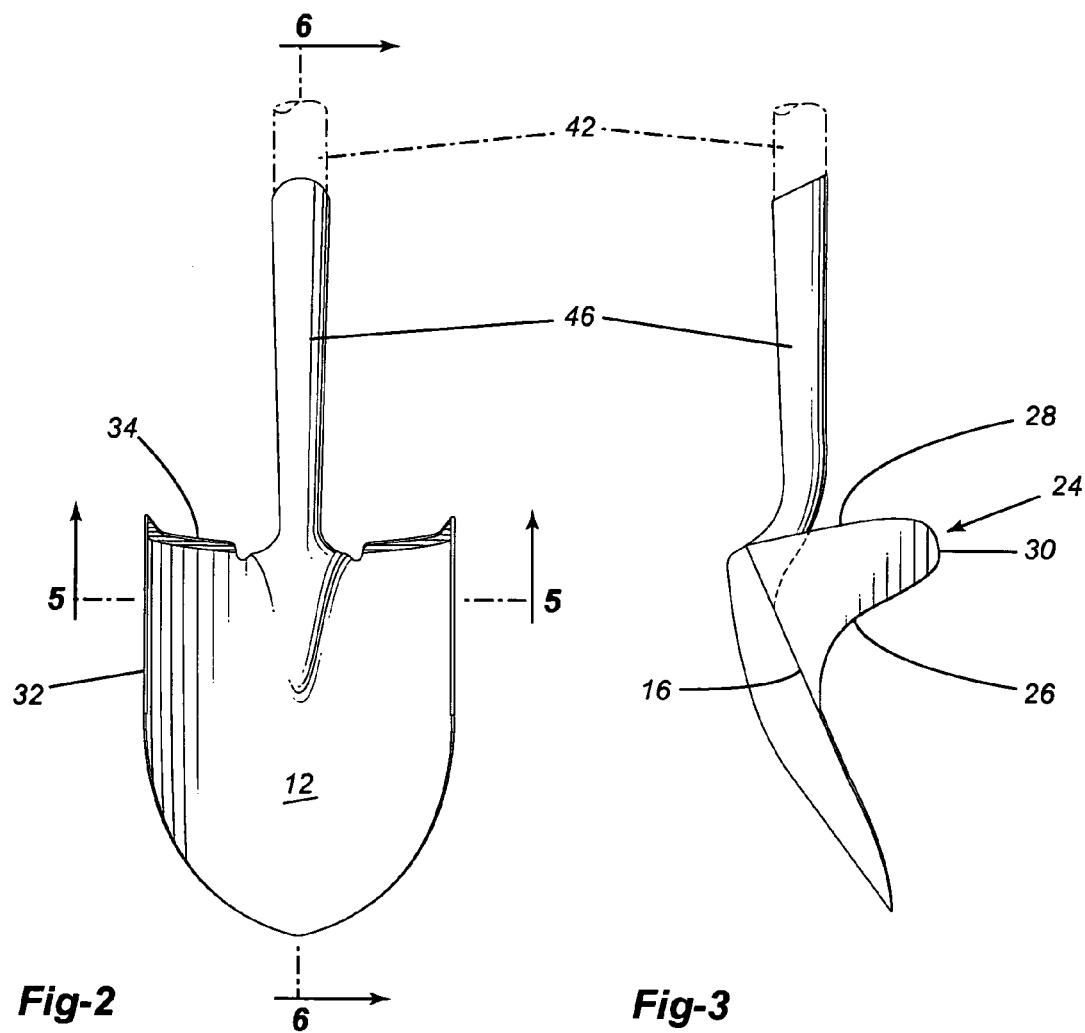
FIG. 2 is a top elevational view thereof.
FIG. 3 is a side elevational view thereof.
Figure 4:
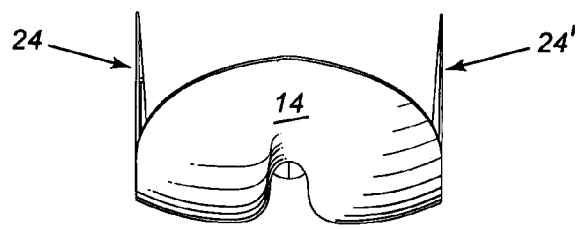
FIG. 4 is a front elevational view thereof.
Figure 5:
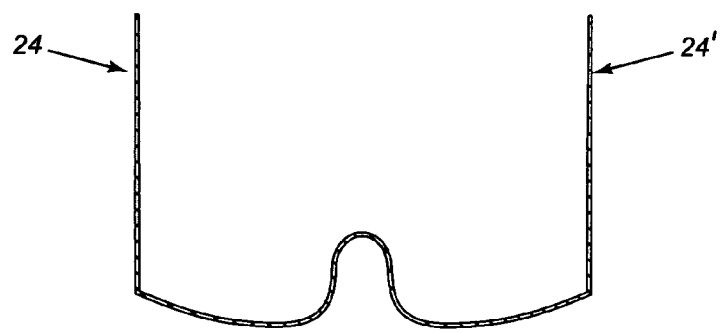
FIG. 5 is a cross-sectional view taken along the lines 5—5 of FIG. 2.
Figure 6:
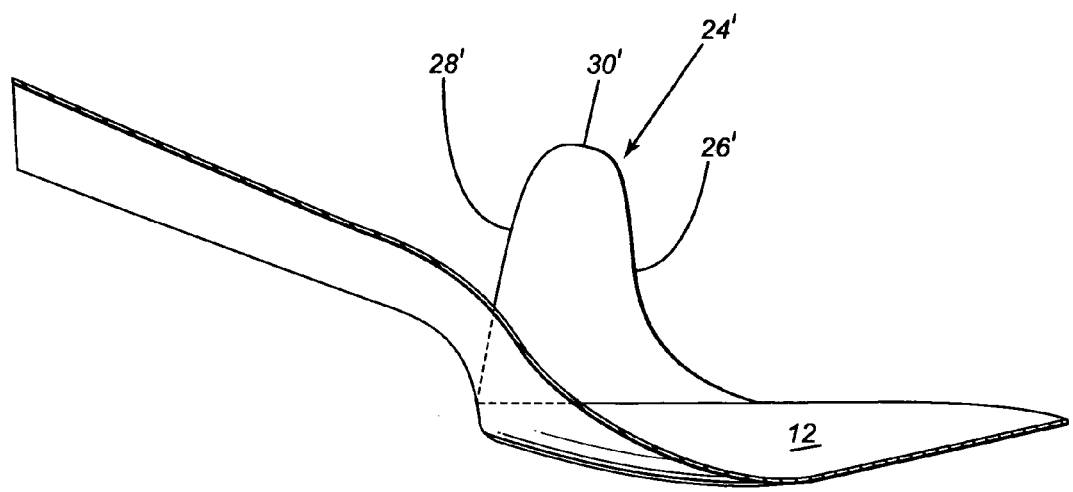
FIG. 6 is a sectional view taken along the lines 6—6 of FIG. 2.

First wing 24 has a first wing front edge 26 which, as may be best seen in FIG. 3, includes a straight portion and then a lower arcuate concave portion merging with first side edge 16 of blade 10. First wing 24 is also defined by a first wing rear edge 28 which extends outwardly from a point adjacent to the shovel rear edge 20. First wing front edge 26 and first wing rear edge 28 are connected by an arcuate first wing top edge 30. A flange 32 extends outwardly from first wing rear edge 28.

As may be seen in FIGS. 1 and 2, each of wings 24, 24" merges with respective side edges of the shovel at point 33,33' which is approximately midway between the shovel rear edge 20 and shovel front edge 22. It will also be noted that the distance between the wing top edge 30 and the shovel side edge 16 is greater than the distance between where wing front edge 26 merges with shovel side edge 16 and rear edge 20. Preferably, the wing extends outwardly for a distance of at least 75 percent of the length of the wings. In so doing, one is able to dig a trench easily since both cutters cut simultaneously which keeps the blade parallel at all times. Furthermore, it permits one to have a greater shovel capacity.

A second wing 24' is substantially identical to first wing 24 and accordingly will not be described in detail herein. Similar reference numerals with a prime are employed for similar parts.

Also, as will be seen, there is provided a shovel rear edge flange 34 which extends rearwardly of rear edge 20.

It will be understood that the above described embodiment is for purposes of illustration only and that changes and modifications can be made thereto without departing from the spirit or scope of the invention.

I claim:

1. A shovel comprising a blade and a handle, said blade consisting essentially of:

first and second shovel side edges;

a shovel rear edge;

a front surface and a rear surface, said front surface having a first portion extending upwardly adjacent said handle, a balance of said front surface extending arcuately between said first and second shovel side edges to provide an uninterrupted front surface having a concave configuration and devoid of any projections therefrom;

only first and second wings, said first and second wings extending outwardly and upwardly from respective shovel side edges;

each of said wings having a wing front edge and a wing rear edge, each of said wing front edges merging with a respective shovel side edge at a point substantially midway between said shovel front edge and said shovel rear edge to thereby define a wing length, each of said wings extendinag outwardly a distance at least equal to 75% of said wing length, each of said wing front edges having a straight edge portion and an arcuate concave portion, said arcuate concave portion extending between said respective shovel side edge and a respective straight edge portion;

a rounded shovel front edge, said shovel front edge being formed where said first and second shovel side edges extend from a respective wing in a continuously arcuate outline to form said rounded shovel front edge.

2. The shovel of claim 1 wherein said wing front edge and said wing rear edge merge to form an arcuate wing top edge.

3. The shovel of claim 1 wherein said wing rear edge extends outwardly from a point proximate said shovel rear edge.

4. The shovel of claim 3 wherein each wing rear edge has an outwardly extending flange.

\* \* \* \* \*